Oct. 14, 1930.  E. P. DU PONT  1,778,025

AUTOMOBILE BODY

Filed April 20, 1928

WITNESS:

INVENTOR

Eleuthere Paul duPont
BY
Buser & Harding
ATTORNEYS.

Patented Oct. 14, 1930

1,778,025

UNITED STATES PATENT OFFICE

ELEUTHERE PAUL DU PONT, OF MONTCHANIN, DELAWARE

AUTOMOBILE BODY

Application filed April 20, 1928. Serial No. 271,453.

My invention relates to an improvement in connection with automobile bodies and more particularly to an improved structure for automobile doors.

Certain types of closed automobile bodies are provided with a windshield which is slanted backwardly in its upward extension and with front doors, the upper portions of which are provided with a slanting edge adapted to fit into the forward door pillars, which are made to slope with the windshield. In doors having a slanting edge the window opening is of irregular shape in that it provides only one vertical guiding edge for the window glass until the window is fully closed, with the result that if the window be only partially closed it will be unsupported along its top and one edge and will rattle and be subjected to breakage from vibration. In certain cases the disadvantage of the structure described has been eliminated by dividing the window opening by means of a fixed post extending vertically parallel with the vertical edge of the window opening and providing therewith a parallel guide for a window. In such a structure the space between the dividing post and the forward door pillar is closed by means of a substantially triangular pane of glass fixed in place. Such a structure is essentially undesirable, since the dividing post is of such size and is so positioned as to obstruct the vision of the driver.

Now, in accordance with my invention I provide a structure of the character indicated in which, however, the window in any position is fully supported and which will not operate to obstruct vision of the driver.

Having now indicated, in a general way, the nature and purpose of my invention, I will proceed to a detailed description of a preferred embodiment thereof with reference to the accompanying drawings in which.

Figure 1:
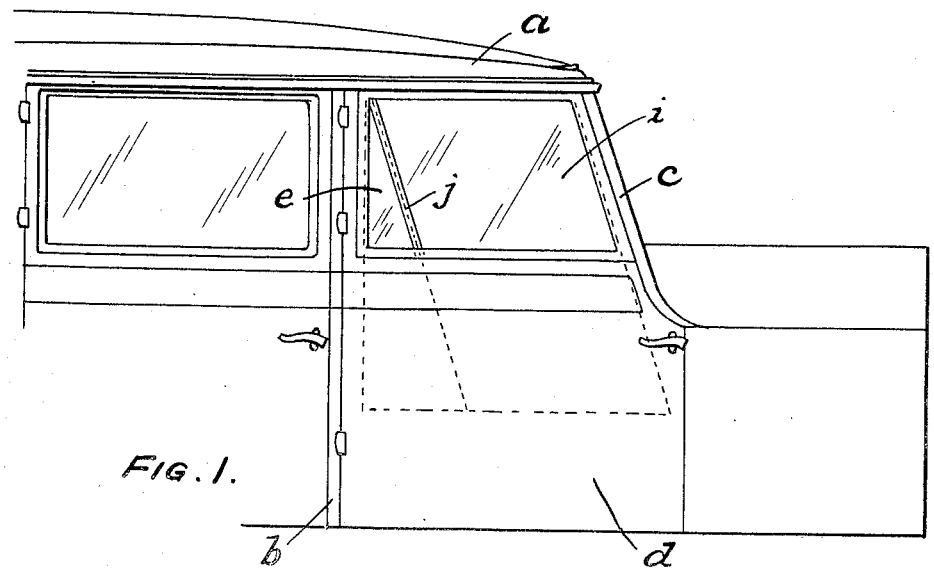
Fig. 1 is a partial side view of an automobile body equipped with a front door embodying my invention.
Figure 2:
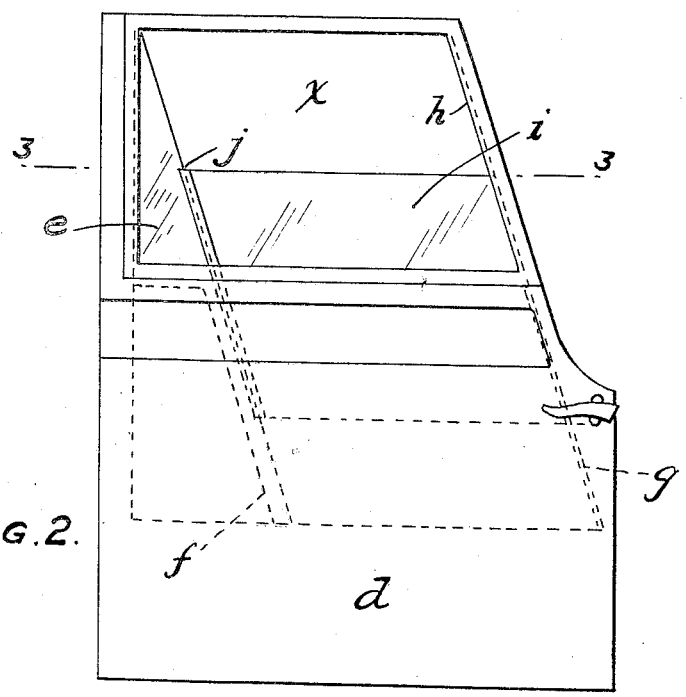
Fig. 2 is a detailed view of the front door shown in Fig. 1.
Figure 3:
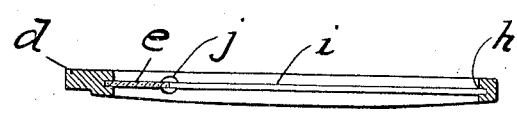
Fig. 3 is a sectional view on line 3—3, Fig. 2.

In the drawings $a$ indicates an automobile body having a door pillar $b$ and a forward door pillar $c$ slanted rearwardly in its upward extension and adapted to support a windshield and receive the upper portion of the forward edge of the front door $d$, which is slanted to conform to the pillar $c$. The upper portion of the door $d$ is cut out to form a window opening $x$, the rear portion of which is permanently closed by a substantially triangular shaped pane of glass $e$. The pane $e$ is positioned with its apex at the top of the window opening and its free side is sloped parallel to the forward side of the opening, which slopes in parallelism to the forward edge of the door and pillar $c$.

Below the lower edge of the window opening the sloping edge of the pane $e$ is continued within the lower portion of the door $d$ by a metal strip $f$, which extends in parallelism with a window guide $g$ extending within the lower portion of the door and forming a continuation of a window guide $h$ formed in the forward side of the window opening.

The window opening $x$ is adapted to be closed by a window $i$, the forward edge of which is adapted to slidably engage in the guide $h$ and its continuation $g$ and to the rear edge of which is secured a guide member $j$ adapted to slidably engage the forward edge of pane $e$ and the continuation thereof formed by the strip $f$. The window $i$ is provided with any desired form of raising and lowering device and, as will be understood, extends within the lower portion of the door when in lowered or partly lowered position.

It will now be noted that in accordance with my invention the window $i$ is supported from top to bottom along its front and rear edges, in all positions from fully open to fully closed, thus obviating any rattle and preventing the window from vibrating with resulting breakage; and it will be further noted that the driver's vision will be unobstructed, since the guide member $j$ is not only relatively narrow, but is positioned to the rear of the field of vision necessary in driving.

What I claim and desire to protect by Letters Patent is:

1. In an automobile having a body provided with upwardly and rearwardly extending pillars arranged to carry a windshield, a door provided with a window guide adjacent to and extending in substantially the same direction as one of the pillars, a pane mounted on the rear of the door and having a forward edge extending in parallelism with the window guide, and a window mounted for sliding movement along said guide and the forward edge of said pane.

2. In an automobile having a body provided with upwardly and rearwardly extending pillars arranged to carry a windshield, a door provided with a window guide adjacent to and extending in substantially the same direction as one of the pillars, a pane mounted on the rear of the door and having a forward edge extending in parallelism with the window guide, and a window mounted for sliding movement along said guide and the forward edge of said pane, said window carrying a member embracing the forward edge of the pane.

In testimony of which invention, I have hereunto set my hand, at Wilmington, Del., on this 17th day of April, 1928.

ELEUTHERE PAUL du PONT.